US005692739A

United States Patent [19]

Pugh

[11] Patent Number: 5,692,739

[45] Date of Patent: Dec. 2, 1997

[54] JIG FOR HOLDING A MODULAR JACK

[76] Inventor: Dennis M. Pugh, 919 Edgewood Dr., Royal Oak, Mich. 48067

[21] Appl. No.: 439,483

[22] Filed: May 11, 1995

[51] Int. Cl.$^6$ ........ B23Q 3/02

[52] U.S. Cl. ........ 269/95; 269/289 R; 269/296; 269/303; 269/903; 269/329

[58] Field of Search ........ 269/284 R, 296, 269/303, 903, 90, 99, 100, 95, 97, 329; 29/857, 861, 760

[56] References Cited

U.S. PATENT DOCUMENTS

| | | | |
|---|---|---|---|
| 4,038,745 | 8/1977 | Nijman . | |
| 4,091,530 | 5/1978 | Nijman et al. . | |
| 4,536,939 | 8/1985 | Hardesty et al. . | |
| 5,509,644 | 4/1996 | Engibarov | 269/99 |

OTHER PUBLICATIONS

Instructions for Quickport (TM) Wallplate of Leviton Mfg., Inc., Oct. 20, 1992.

*Primary Examiner*—Robert C. Watson
*Attorney, Agent, or Firm*—Peter D. Keefe

[57] ABSTRACT

A jig for releasably holding a modular jack having a base and a modular jack holder connected thereto. The base is structured for being placed upon a rest surface, such as a table top or a floor, wherein it provides a stable platform. The modular jack holder has a work surface and is provided with an L-shaped slot having a perpendicular slot component and a parallel slot component (the L-shaped slot component orientations being with respect to the work surface). The perpendicular slot component of the L-shaped slot opens at the work surface and has a first predetermined depth with respect thereto. The parallel slot component of the L-shaped slot communicates with the perpendicular slot component and extends a second predetermined distance spaced from, and parallel with respect to, the work surface. A front face of the modular jack holder is provided which extends from the base to the work surface, wherein both the parallel and perpendicular slot components of the L-shaped slot are open thereat. In this regard, an overhang having a predetermined thickness is formed at the work surface by the parallel slot component, and runs parallel with the perpendicular slot component. A left face adjoins the front face and is spaced from the perpendicular slot component a third predetermined distance. An offset is provided in the work surface between the perpendicular slot component and the left face.

16 Claims, 1 Drawing Sheet

JIG FOR HOLDING A MODULAR JACK

BACKGROUND OF THE INVENTION

1. Field of the invention

The present invention relates to jigs for holding a workpiece in a predetermined fixed position while the workpiece is being subjected to an operation. More particularly, the present invention relates to a jig which is configured for interfacing with a modular jack to thereby positionally affix the modular jack while electrical conductor connections are being made thereto.

2. Description of the Related Art

Modular jacks are very commonly used today for providing an outlet for being selectively releasably connected to a data communications plug, as for example for a telephone or computer system. As shown by FIG. 1, modular jacks 10 have a body 12, wherein a forward facing end thereof 12*a* is associated with a plug receptacle 14 for receiving thereinto a data communications plug (not shown), and a rear facing end 12*b* thereof is associated with an electrical connection bus 16. The electrical connection bus 16 usually has a number of electrical conductor terminals 18. Internally to the modular jack 10 is wiring and connectors (not shown) running between the electrical connection bus and the plug receptacle 14 to thereby electrically connect a plug received in the plug receptacle with a cable connected with the electrical connection bus 16.

As also shown by FIG. 1, the modular jack 10 interfaces with an opening 20 in a faceplate 15, via a selectively releasable interconnection therebetween. In this regard, for example, behind the opening 20 at each of the upper and lower sides thereof is a rib 22. The upper side 24 of the modular jack 10 adjacent the plug receptacle 14 is provided with a first lip 26 for interferingly abutting one of the ribs 22 (an example of a height thereof is about one-sixteenth inch). The opposite, lower side 28 of the body 12 of the modular jack 10 is provided with an L-shaped tab 30, wherein a foot 30*a* thereof is integral with the body opposite the electrical connection bus 16 (an example of a height thereof is about one-sixteenth inch and an example of a thickness thereof is about two-sixteenths inch), and wherein an arm 30*b* thereof projects therefrom toward the forward facing end 12*a* of the body 12 in spaced parallel relation thereto (an example of a length thereof is about one-half inch). A second lip 32 is provided at the terminous of the arm 30*b* (an example of a height thereof is about one-sixteenth inch). The arm 30*b* is flexible between the foot 30*a* and the second lip 32, whereby flexing of the arm allows for the forward facing end 12*a* of the body 12 of the modular jack 10 to be connectably held at a selected opening 20 in the faceplate 15 by operation of the first and second lips interferingly abutting respective ribs 22. As can also be seen by reference to FIG. 1, a boss 34 extends from the lower side 28 of the body 12 along the rear facing end 12*b* thereof. A recess 36 is formed in the body 12 between the foot 30*a* and the boss 34 (an example of a height differential thereof with respect to the body opposite the arm 30*b* is about one-sixteenth inch, and an example of the length thereof as measured from the foot 30*a* to the boss 34 is about six-sixteenths inch). The width W of the body 12 (see FIG. 3) is on the order of, for example, about ten-sixteenths inch.

As shown in FIG. 4, an impact tool 38, such as that made under U.S. Pat. Nos. 3,708,852, 4,161,061 and 4,241,496, is used to insert bare electrical conductor ends into, respectively, selected electrical conductor terminals 18 to thereby make permanent electrical connections between a communications cable 40, having a number of electrical conductors 42 therewithin, and the modular jack 10. During this insertion process, the installer must carefully choose the right electrical conductor, select the right electrical terminal therefor, align the bare end of the selected electrical conductor with the selected electrical terminal, then pressably use the impact tool collectively thereupon to achieve the connection of the conductor with the terminal. Problematically, the communications cable 40 and its associated electrical conductors 42 have an inherent resiliency which tends to cause the modular jack 10 to "walk" or "jump" around the work surface upon which the insertion process is being performed. This leads to frustration and potential installation errors. One "solution" has been to nest the modular jack in the lap of the installer. However, this is inconvenient and can be potentially dangerous because of the possibility of injury from a slip of the impact tool 38 during its usage.

Accordingly, what is needed in the art is a jig which can temporarily hold a modular jack while electrical conductors are being installed at the electrical connection bus thereof.

SUMMARY OF THE INVENTION

The present invention is a jig which is configured to provide temporary holding of a modular jack while electrical conductors are being installed at the electrical connection bus thereof.

The jig according to the present invention includes a base and a modular jack holder connected thereto. The base is structured for being placed upon a rest surface, such as a table top or a floor, where it provides a stable platform. The modular jack holder has a work surface and is provided with an L-shaped slot having a perpendicular slot component and a parallel slot component (the L-shaped slot component orientations being with respect to the work surface). The perpendicular slot component of the L-shaped slot opens at the work surface and has a first predetermined depth with respect thereto. The parallel slot component of the L-shaped slot communicates with the perpendicular slot component and extends a second predetermined distance spaced from, and parallel with respect to, the work surface. A front face of the modular jack holder is provided which extends from the base to the work surface, wherein both the parallel and perpendicular slot components of the L-shaped slot are open thereat. In this regard, an overhang having a predetermined thickness is formed at the work surface by the parallel slot component, and runs parallel with the perpendicular slot component. A left face adjoins the front face and is spaced from the perpendicular slot component a third predetermined distance. An offset is provided in the work surface between the perpendicular slot component and the left face.

In operation with respect to a modular jack, a user grasps the modular jack so that the upper side having the electrical connection bus faces up. The user then aligns the modular jack so that the rear facing end thereof faces toward the left face of the modular jack holder and the L-shaped tab is aligned with respect to the L-shaped slot at the front face of the modular jack holder. The user now slides the L-shaped tab into the L-shaped slot, wherein the lower surface of the body slides along the work surface, the recess of the body slides along the offset, and the boss at the rear facing side of the modular phone jack abuts the left face of the modular jack holder. Sliding continues preferably until the foot of the L-shaped tab strikes the terminous of the perpendicular slot component of the L-shaped slot, Now the user has fixedly located the modular jack with respect to the base, so that conductor alignment and impact tool usage are safely and efficiently facilitated. When installation of electrical conductors to the terminals of the modular jack has been completed, the user simply slides the L-shaped tab out of the L-shape slot and then installs the modular jack into the faceplate, as desired.

Accordingly, it is an object of the present invention to provide a jig for temporarily fixating a modular jack so that electrical conductor connection thereto may be effected in an efficient and safe manner.

It is another object of the present invention to provide a jig for temporarily fixating a modular jack which is easily carried to and used at a job site.

These, and additional objects, advantages, features and benefits of the present invention will become apparent from the following specification.

DETAILED DESCRIPTION OF THE PREFERRED EMBODIMENT

Figure 1:
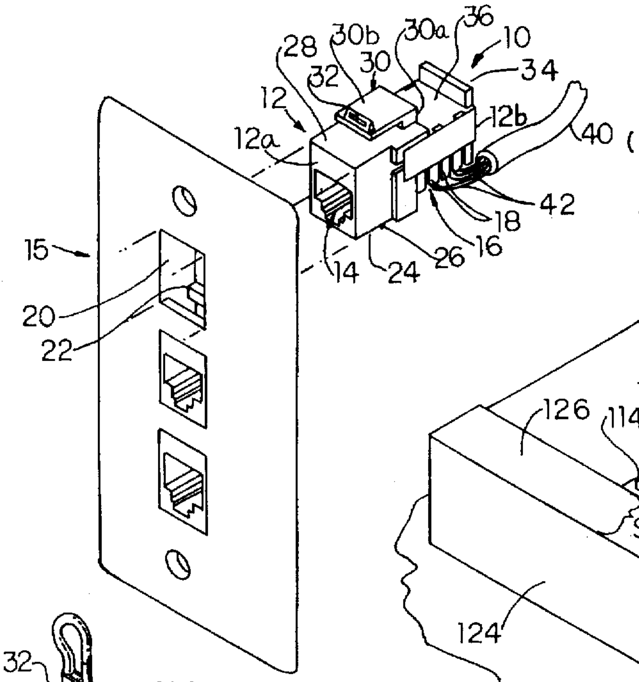
(PRIOR ART) FIG. 1
FIG. 1 is a perspective view of a prior art modular jack, multi-conductor cable and faceplate.
Figure 3:
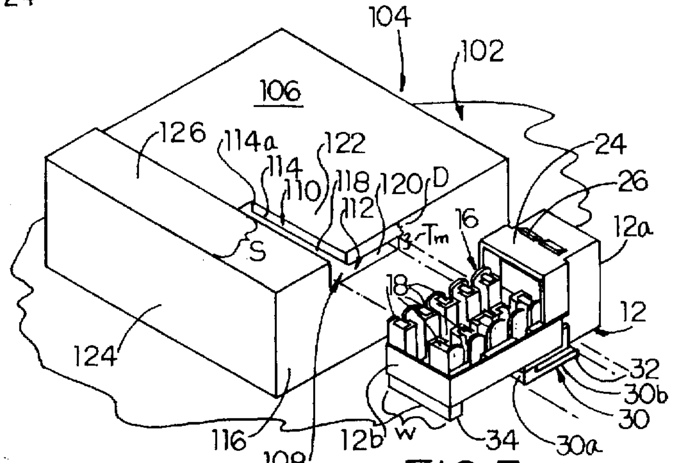
FIG. 3 is a detail perspective view of the jig according to the present out to be used with respect to a modular jack.
Figure 2:
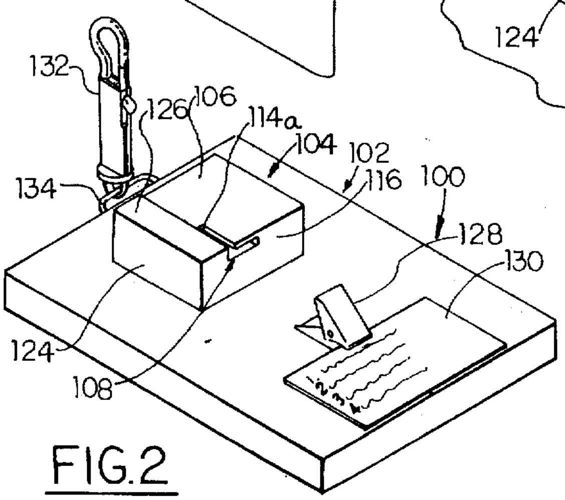
FIG. 2 is a perspective view of the jig according to the present invention.

Referring now to the Drawing, FIG. 2 depicts the preferred form of the jig 100 according to the present invention. The jig 100 includes a base 102 and a modular jack holder 104 connected thereto. The base 102 serves to provide a stable platform for the modular jack holder 104, and the modular jack holder provides a releasable interface with a modular jack whereby the modular jack is fixedly positioned relative to the base so that work may be performed on the modular jack without concern for unpredictable movements thereof. The preferred structural material is plastic, wherein preferably the base 102 and the modular jack holder 104 are formed of a single piece unit.

The base 102 is structured for being placed upon a resting surface, such as a table top or a floor, wherein it lies thereupon. In this regard, the base may be moderately weighted (in relation to the weight of a modular jack, such as for example four or more ounces) so that it would tend to remain laying in a predetermined location even when being forcibly acted upon by the inherent resliency of a multi-conductor cable (such as twisting or sliding forces). The bottom of the base may or may not have a friction enhancing pad for coacting with the resting surface. The area of the base is preferred to be much larger than a modular jack, yet small enough to be easily carried by a user to and from job sites, as for example on the order of nine by four inches, and at minimum on the order of about three by three inches. The base is rigid and the modular jack holder is situated anywhere thereupon, preferably somewhat medially.

The modular jack holder 104 has a work surface 106 and is provided with an L-shaped slot 108 having a perpendicular slot component 110 oriented perpendicular with respect to the work surface and a parallel slot component 112 oriented parallel with respect to the work surface. The perpendicular slot component 110 of the L-shaped slot 108 has a first slot opening 114 at the work surface. The parallel slot component 112 of the L-shaped slot 108 communicates with the perpendicular slot component 110 and is located a predetermined spaced distance D from, and parallel with respect to, the work surface 106.

A front face 116 of the modular jack holder 104 is provided which extends from the base 102 to the work surface 106, wherein the perpendicular slot component 110 has a second slot opening thereat, and the parallel slot component 112 has a third slot opening 120 thereat which intersectingly conjoins the second slot opening. The vertical and horizontal slot components 110, 112 of the L-shaped slot 108 result in formation of an overhang 122 having a thickness defined by the aforementioned distance D.

A left face 124 adjoins the front face 116. The left face is prependicular to the front face 116 and is parallel to the perpendicular slot component 114, wherein it is spaced a predetermined distance S therefrom. An offset 126 is provided in the work surface 106 which is raised thereabove a predetermined height H between the left face 124 and the perpendicular slot 114.

In order that the modular jack holder 104 interfaces well with a modular jack 10 so that it is affixedly positioned with respect to the jig 100, the perpendicular slot component 114 should extend from the front face 116 to a terminous **114*a* a distance at least as long as the modular jack is wide W, and further that the perpendicular slot component be about at least as wide as the thickness of the foot 30*a* of the modular jack. Still further, the thickness D of the overhang 122 should be about equal to the separation of the tab 30*b* from the body 12. The width of the parallel slot can be any desired width larger than a minimum thickness $T_m$ defined by the thickness of the arm 30*b* and its associated second lip 32, even reaching to the base, and indeed, the interior of the modular jack holder could be hollow. In this respect further, the height of the work surface above the base need only be the aforesaid minimum parallel slot thickness. Finally, the offset 126 is structured to be received by the recess 36 of the body 12 of the modular jack 10 so that the modular jack is stably supported thereat as well as at the work surface 106**.

Figure 5:
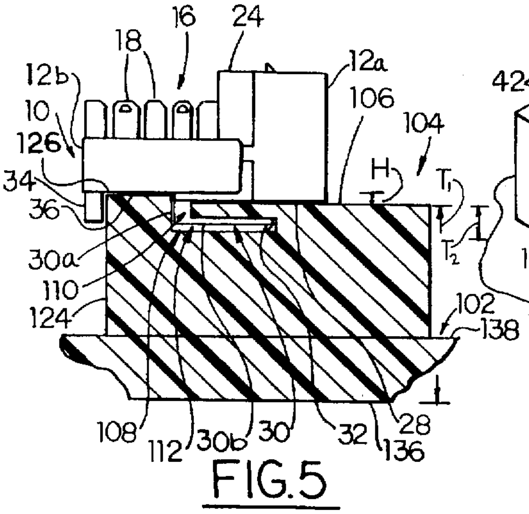
FIG. 5 is a partly sectional side view of the jig according to the present invention being used with respect to a modular jack.
Figure 4:
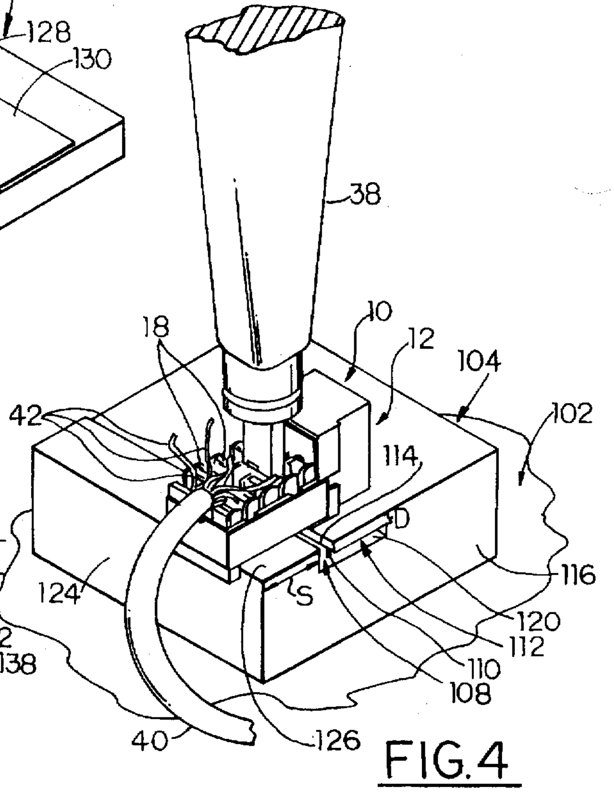
FIG. 4 is a detail perspective view of the jig according to the present invention being used with respect to a modular jack.

As indicated by FIG. 5, the work surface 106 is preferred to be located a thickness $T_1$ from the bottom 136 of the base 102. However, the minimum thickness $T_2$ between the bottom 136 and the work surface 106 is defined by the minimum width $T_m$ of the parallel slot component 102 plus the thickness D of the overhang 122. In this regard, the work surface could be alternatively located at the top 138 of the base, wherein the modular jack holder is integrated within the base.

Per the dimensions given hereinabove for a common type of modular jack 10, the modular jack holder 104 would have the following exemplary dimensions: the parallel slot component would be at least ten-sixteenths inch long and a little over two-sixteenths inch wide, the perpendicular slot component would be at least about two-sixteenths inch wide and about one-half inch long (including the second opening), the width of the offset would be about six-sixteenths inch and have a height of about one-sixteenth inch above the work surface, and the overhang would have a thickness of about one-sixteenth inch.

In operation with respect to a modular jack 10, a user grasps the modular jack so that the upper side 24 having the electrical connection bus 16 faces up (with respect to the work surface 106). The user then aligns the modular jack so that the rear facing end **12*b*** thereof faces toward the left face 124 of the modular jack holder 104 and the L-shaped tab 30 is aligned with respect to the L-shaped slot 108 at the front face 116 of the modular jack holder.

The user then slides the L-shaped tab into the L-shaped slot, wherein the lower surface of the body 28 slides along the work surface, the recess 36 of the body 12 slides along the offset 126, and the boss 34 at the rear facing side of the modular jack abuts the left face of the modular jack holder. Sliding continues preferably until the foot 30*a* of the L-shaped tab strikes the terminous of the perpendicular slot component 114 of the L-shaped slot.

Now the user has fixedly located the modular jack with respect to the base 102 which is, itself, resting upon some stable structure, so that conductor alignment and impact tool usage are safely and efficiently facilitated. When installation of electrical conductors to the terminals of the modular jack has been completed, the user simply slides the L-shape tab out of the L-shape slot and then installs the modular jack into a faceplate or performs another operation as needed.

With regard to the installation of particular electrical conductors 42 with respect to particular electrical terminals 18, it is extremely important that the user make no errors. Accordingly, a resiliently biased clip 128 is provided on the base 102 so that one or more replaceable guide sheets 130 having instructions for a particular job at hand can be located with the jig 100.

Finally, it is desirable for the jig 100 to be easily and conveniently carried from job site to job site. In this regard, a spring biased connector 132 is preferably connected with the base 102, such as by a ring 134. As an example of use thereof, a user can connect the connector 132 to an article worn by the user, such as for example a belt loop (not shown) and then have both hands free to carry other things.

An alternative embodiment (though not considered a "best mode") of the present invention may include a battery powered light to thereby illuminate the plug receptacle when resting upon the working surface, so that electrical conductors can be installed at the electrical connection bus in dimly lit environments.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A jig for holding a modular jack, said jig comprising:

a base having a top and an opposite bottom; and and a modular jack holder located at said top of said base, comprising:

a work surface;

a front face oriented substantially perpendicular to said work surface;

a left face adjoining said front face and oriented substantially perpendicular to each of said front face and said work surface;

an overhang formed of said work surface, said overhang being defined by an L-shaped slot formed in said modular jack holder, sail L-shaped slot comprising a perpendicular slot component oriented perpendicular to said work surface and parallel with respect to said left face, said perpendicular slot component being spaced a first predetermined distance from said left face, said perpendicular component having a first opening formed at said work surface and a second opening formed at said front face, said L-shaped slot further comprising a parallel slot component communicating with said perpendicular slot component, said parallel slot component being oriented parallel with respect to said work surface and located a second predetermined distance therefrom, said parallel slot component having a third opening formed at said front face which intersects said second opening, wherein said second predetermined distance defines a thickness of said overhang; and an offset formed at said work surface between said first opening and said left face, said offset being elevated with respect to said work surface a third predetermined distance.

2. The jig of claim 1, wherein said base has an area of at least nine square inches; and wherein said base has a weight of at least four ounces.

3. The jig of claim 2, wherein said first predetermined distance is substantially six-sixteenths inch, said second predetermined distance is substantially one-sixteenth inch, and where said third predetermined distance is substantially one-sixteenth inch.

4. The jig of claim 3, wherein said bottom is spaced from said work surface a distance of substantially at least three-sixteenths inches.

5. The jig of claim 1, further comprising a clip connected with said top of said base for selectively holding sheets.

6. The jig of claim 5, further comprising clasp means for selectively connecting said base to an article of clothing of a user.

7. The jig of claim 1, further comprising clasp means for selectively connecting said base to an article worn by a user.

8. A jig for holding a modular jack, wherein the modular jack has an upper side and an opposite lower side, the upper side having an electrical connection bus and the lower side having an L-shaped tab defined by a foot and a tab, a boss spaced from the foot, and a recess formed between the boss and the foot, said jig providing selective holding of the modular jack so that a user may perform work on the electrical connection bus thereof, said jig comprising:

a base having a top and an opposite bottom; and a modular jack holder located at said top of said base, comprising:

a work surface;

a front face oriented substantially perpendicular to said work surface;

a left face adjoining said front face and oriented substantially perpendicular to each of said front face and said work surface;

an overhang formed of said work surface, said overhang being defined by an L-shaped slot formed in said modular jack holder, said L-shaped slot comprising a perpendicular slot component oriented perpendicular to said work surface and parallel with respect to said left face, said perpendicular slot component being spaced a first predetermined distance from said left face, said perpendicular component having a first opening formed at said work surface and a second opening formed at said front face, said L-shaped slot further comprising a parallel slot component communicating with said perpendicular slot component, said parallel slot component being oriented parallel with respect to said work surface and located a second predetermined distance therefrom, said parallel slot component having a third opening formed at said front face which intersects said second opening, wherein said second predetermined distance defines a thickness of said overhang; and an offset formed at said work surface between said first opening and said left face, said offset being elevated with respect to said work surface a third predetermined distance;

wherein when said L-shaped slot removably receives thereinto an L-shape tab of a modular jack, the boss of the modular jack abuts said left face and the recess of the modular jack abuttingly receives therein said offset; and whereby when the L-shaped slot has received thereinto said L-shaped tab of the modular jack, the modular jack is thereupon affixed with respect to said modular jack holder, whereupon a user may perform work on the electrical connection bus thereof.

9. The jig of claim 8, further comprising a clip connected with said top of said base for selectively holding sheets.

10. The jig of claim 8, further comprising clasp means for selectively connecting said base to an article worn by a user.

11. The jig of claim 8, wherein said base has a predetermined area and said jig has a predetermined weight, wherein when said bottom of said base rests upon a surface and the electrical connection bus of the modular jack is connected to an electrical cable having an inherent resiliency, said base tends to remain unmoving when acted upon by forces emanating from the inherent resiliency of the electrical cable.

12. The jig of claim 11, where said predetermined area is at least nine square inches and said predetermined weight is at least four ounces.

13. The jig of claim 12, wherein said first predetermined distance is substantially six-sixteenths inch, said second predetermined distance is substantially one-sixteenth inch, and wherein said third predetermined distance is substantially one-sixteenth inch.

14. The jig of claim 13, wherein said bottom is spaced from said work surface a distance of substantially at least three-sixteenths inch.

15. The jig of claim 14, further comprising a clip connected with said top of said base for selectively holding sheets.

16. The jig of claim 15, further comprising clasp means for selectively connecting said base to an article worn by a user.

* * * * *